US011865676B2

(12) United States Patent
Buchanan

(10) Patent No.: US 11,865,676 B2
(45) Date of Patent: Jan. 9, 2024

(54) ADJUSTABLE WRENCH

(71) Applicant: Nigel Buchanan, Fife (GB)

(72) Inventor: Nigel Buchanan, Fife (GB)

( * ) Notice: Subject to any disclaimer, the term of this patent is extended or adjusted under 35 U.S.C. 154(b) by 748 days.

(21) Appl. No.: 16/966,942

(22) PCT Filed: Feb. 1, 2019

(86) PCT No.: PCT/GB2019/000016
§ 371 (c)(1),
(2) Date: Aug. 3, 2020

(87) PCT Pub. No.: WO2019/150068
PCT Pub. Date: Aug. 8, 2019

(65) Prior Publication Data
US 2021/0046618 A1 Feb. 18, 2021

(30) Foreign Application Priority Data
Feb. 1, 2018 (GB) ..................................... 1801701

(51) Int. Cl.
*B25B 13/22* (2006.01)
*B25B 13/14* (2006.01)
*B25B 13/46* (2006.01)

(52) U.S. Cl.
CPC .............. *B25B 13/22* (2013.01); *B25B 13/14* (2013.01); *B25B 13/463* (2013.01)

(58) Field of Classification Search
CPC .......... B25B 13/22; B25B 13/14; B25B 13/46
See application file for complete search history.

(56) References Cited

U.S. PATENT DOCUMENTS 2,707,413 A * 5/1955 Goodnow ............... B25B 13/46 81/177.9
3,101,018 A * 8/1963 Andersen ................ B25B 13/22 81/142
3,407,689 A * 10/1968 Slayton ................... B25B 13/46 81/134
3,572,190 A * 3/1971 Oeland, Jr. ............. B25B 13/14 81/127

(Continued)

*Primary Examiner* — David B. Thomas
(74) *Attorney, Agent, or Firm* — Patterson Intellectual Property Law, PC; Emily A. Shouse

(57) ABSTRACT

An adjustable wrench (1) with a head portion (200), automatically adjustable within its size range. The fastener (80) to be operated is fitted between the fixed jaw (201) and moving jaw (300), the operators thumb pressure released, automatically propelling the moving jaw 300 towards the fixed jaw (200), the use of four workpiece contacting surfaces (202, 203, 302, 303), two within each opposing jaw (201, 300), engaging the four corresponding actual levered faces (83) to each apply a drive force to a hexagonal fastener head 81. The head portion (200) illustrated in section in order to show the gear teeth (403) on the head end (402) of the handle (400) levering closed the moving jaw (300) via its associated wedge-shaped rack gear (312). The handle (400) pivoting at the point PP that the relevant head end gear tooth (403) engages the corresponding rack gear tooth (312) further urging the handle locking teeth (407) into the pawl locking teeth (61) within the confines of the elongate pin hole elongate portion 404 creating a further jaw (201, 300) ratcheting/locking closure mechanism.

20 Claims, 11 Drawing Sheets

(56) References Cited

U.S. PATENT DOCUMENTS

| | | | | |
|---|---|---|---|---|
| 4,084,456 | A * | 4/1978 | Pasbrig | B25B 13/10 81/177.8 |
| 4,094,215 | A * | 6/1978 | Hudson | B25B 13/14 81/133 |
| 5,095,782 | A * | 3/1992 | Galea | B25B 13/14 81/127 |
| 6,089,129 | A * | 7/2000 | Huang | B25B 13/46 81/133 |
| 6,167,786 | B1 * | 1/2001 | Kilgore | B25B 13/20 81/142 |
| 6,216,564 | B1 * | 4/2001 | Pasbrig | B25B 13/14 81/135 |
| 6,834,569 | B2 * | 12/2004 | Wang | B25B 13/14 81/133 |
| 2017/0165814 | A1 * | 6/2017 | Chern | B25B 13/12 |

* cited by examiner 404
405
70
406

CF
201
202
80
300
CF
71
400
D 409
80
64
65
63
60
407
411
410
66

ADJUSTABLE WRENCH

FIELD OF INVENTION

The invention relates to a hand tool used for the operation of, for example, hexagonal headed fasteners and tubular pipework fittings, and in particular to an adjustable wrench with a fixed jaw and a moving jaw.

BACKGROUND TO THE INVENTION

A conventional wrench is a tool used to provide grip and mechanical advantage in applying torque to turn objects usually rotary fasteners, such as nuts and bolts. One type of wrench is called an open-end wrench, which usually has a U-shaped opening to grip two opposite faces of the bolt or nut fastener head. As torque is applied to the socket or wrench head the torque is transmitted to the fastener head to turn the fastener in the appropriate direction.

Sockets or ring type wrenches are preferable to open-end type wrenches because the torque applied to the socket is transmitted to the fastener via a much larger contact area and the ring head of the socket or wrench can transmit a far greater torque with less harmful distortion of the fastener head and less chance of the socket or wrench head damaging or slipping off the fastener.

In order to fit and operate as many differing sizes of fasteners as possible with one tool, adjustable wrenches are known. By far the most common type is typified by the adjustable wrench disclosed in TW201527051. This type of adjustable wrench comprises a handle, a head, a slideable jaw, an axial rod and a worm gear. The head is formed with a fixed jaw, a sliding rail, and a receiving slot. The slideable jaw has a sliding rod smoothly disposed in the sliding rail of the head. The axial rod and the worm gear disposed in the receiving slot of the head and the worm gear engages with the sliding rod of the slideable jaw to control the movement of the slideable jaw in relation to the fixed jaw so that an opening formed between the fixed and slideable jaw can be usefully adjusted for the operation of different sizes of fastener head whether metric or inch. The wrench normally grips only on the two opposing sides of the square or hexagonal fastener heads or workpiece, the drive faces.

In order to provide grip on more sides of hexagonal fasteners by the opposing jaws of the wrench, some prior art wrenches, such as the wrench disclosed by US2009/0193939, have jaws provided with V-shaped gripping surfaces. As only the leading half of the hexagonal fastener head faces in the operated direction, the "V" shape recess must be deep enough to provide a suitable fastener drive engagement surface. This results in an extreme limitation of the size range of fasteners capable of being suitably operated.

US2012/0247281 discloses an adjustable wrench for use with specialty fasteners with 3 flat faces and 3 round faces. The wrench has a fixed jaw with a V recess and a flat third gripping surface which is slideable when operated in the reverse or reposition direction, in order to form a ratcheting configuration. Hexagonal fasteners can be 3 face operated as long as the operated hexagonal fastener head still protrudes outward of the V recess for clamping by the moving jaw third flat face. In order to operate smaller sizes of fastener the nose of the fixed jaw is substantially parallel to the moving jaw face, the fastener can then be operated by only 2 faces.

U.S. Pat. No. 5,209,144 discloses a dual-purpose wrench having a moving jaw can be alternated to function as a pipe wrench by removing the moveable jaw unit, reversing and inserting it back into the wrench body. What was previously the lower outer surface of the moving jaw now acts as a pivotal straight toothed surface, which in conjunction with the fixed jaw operating surface grips the worked pipe or round workpiece in order to rotate the same.

U.S. Pat. No. 5,209,144 and EP0464016 disclose a combination tool in the form of an "monkey wrench" or pipe wrench with a reversible jaw, the commercially available device being the EP0464016, these devices when used in the pipe wrench mode require to be used in the non-intuitive opposite direction to that of the adjustable wrench normal torque use, even the pipe engagement teeth facing the reverse direction.

In these prior art devices, it takes considerable use of the thumb operated worm screw to adjust from small to large operating sizes or remove and replace the moving jaw, furthermore any attempt at making a useful three or four jaw grip upon the operated fastener cannot be accomplished over the fastener size range normally operated by a similar sized standard adjustable wrench.

U.S. Pat. No. 6,216,564 discloses a commercially available self-adjusting wrench having a handle with circularly arranged teeth upon its abutment end which cooperate with correspondingly pitched teeth within a rack that forms part of the moving jaw, each set of teeth being of similar pitch and profile. The head can be operated into the open position by the swiveling of the head relative to the handle portion against the attached resilient portion, the said rotation causing the handle gear teeth to operate the rack teeth in a rack and pinion manner. The handle when operated in the drive direction correspondingly closes the jaw drive faces upon the worked fastener. The wrench was a commercial failure as the locking or clamping pressure was only 6/1 regardless of the size of fastener or pipe operated, the wrench was therefore incapable of preventing the jaws opening or spreading when the wrench was subjected to robust use.

Furthermore, as only 50% of the faces of a fastener operated are actually levered, those in the drive direction, the drawings and the actual manufactured items made to U.S. Pat. No. 6,216,564 actually only grip two of the true drive faces whilst appearing to grip our and only one of those having gripping teeth.

SUMMARY OF THE INVENTION

It is a general object of the invention to provide an improved more versatile adjustable wrench which avoids the disadvantages of prior art wrenches while affording additional structural and operational advantages, or to provide an alternative to existing products or at least to provide an alternative to known adjustable wrenches.

Throughout the following description specific details are set forth in order to provide a more thorough understanding to persons skilled in the art. However, well known elements may not have been shown or described in detail to avoid unnecessary obscuring of the disclosure. Accordingly, the description and drawings are to be regarded as illustrative, rather than in a restrictive sense.

A feature of the invention, may be that when is the use, a ratchet like locking design is used to prevent as much as possible the jaws "spreading" when the wrench is applying a force to a fastener in the drive direction, comprising of a set of ratchet teeth, in best practice with saw like profiles, within the periphery of the levered end of the handle portion, capable of engagement with correspondingly profiled "pawl" teeth mounted within the head portion. The handle pivot axle bore is further appropriately elongated such that when the jaw operating faces have engaged the worked fastener and the handle portion is robustly operated in the drive direction whereby the operating handle portion gear teeth when engaged with the corresponding moving jaw gear teeth causes the handle portion to pivot around the point of engagement between the engaged gear teeth into and within the confines of the handle pivot axle bore elongation, the handle ratchet teeth are thereby propelled into engagement with the corresponding "pawl" teeth within the head portion. The handle portion can as it is further operated usefully increase the gripping force of the jaw operating faces upon the worked fastener, whereby the handle ratchet teeth can further usefully move up the corresponding inclined "pawl" teeth in order as required to engage the next set of ratchet locking angled faces which in best practice are equivalent to a generally radial line from the centre of the axle pin. As any further extremely robust operation of drive force applied to the worked fastener might reach a point whereas it would in prior art devices be greater than the gripping force generated by the ratio of the levering to levered forces generated within the handle portion upon the moving jaw geared rack to the jaw operating faces, the locking engagement between the ratchet and "pawl" teeth locking faces can now advantageously prevent the "spreading" of the jaw portions due to as in the prior art devices the gearing ratio of the handle levering to levered portions being insufficient at any point during the robust drive action. In the reverse or reposition action the handle portion is now pivoted upon the back face of the handle gear tooth engaged upon the back face of the opposing corresponding moving jaw geared rack gear tooth, usefully levering out of engagement as required the locking ratchet teeth from the pawl teeth, further releasing any ratchet locking function. If the wrench requires to be operated in the opposite direction the wrench is simply flipped over.

A still further feature of the invention may be the use is the handle pivot axle bore requires to be further appropriately elongated such that when the jaw operating faces have engaged the worked fastener and the handle portion is robustly operated in the drive direction, whereby the operating handle portion gear tooth engaged with the corresponding moving jaw gear tooth causes the handle portion to pivot around the point of engagement of the engaged gear teeth propelling the pivot pin into and within the confines of the handle pivot axle bore elongation, usefully further propelling into engagement the handle ratchet teeth into the corresponding "pawl" teeth within the head portion. The further orientation of the inner profile of the preferred spiral resilient portion against the axle pin circumference ensuring the pivot pin is suitably disengaged from the handle pivot axle bore elongation and any ratchet engagement is removed when the wrench is at rest.

A still further feature of the invention may be the use of a geared closure mechanism to provide an adjustable wrench incorporating an automatic sprung ratchet like facility. In the best example a spiral type spring can be usefully located in a planar position between the handle and the head portion. The inner end profile of the spring positioned within a location hole or notch to the handle near to the pivot hole, the outer spring end profile located within a notch in the fixed head portion such to impart resilient closure of the moving jaw relative to the fixed jaw by resiliently propelling the handle around its pivot pin relative to the fixed head, the handle gear teeth meshed with the rack gear resiliently biasing closed the jaw gap when the wrench is at rest.

An even further feature of the invention may be the orientation of the inner profile of the preferred spiral resilient portion against the axle pin circumference causing a biasing action ensuring the pivot pin is disengaged from the handle pivot axle bore elongation and therefore any ratchet engagement is removed when the wrench is at rest. Said elongated handle pivot axle bore is utilized such that, when the jaw operating faces have engaged the worked fastener and the handle portion is robustly operated in the drive direction whereas the operating handle portion gear teeth engaged with the corresponding moving jaw gear teeth causes the handle portion to pivot around the point of engagement of the engaged gear teeth into and within the confines of the said handle pivot axle bore elongation against and resiliently compressing the inner profile of the preferred spiral resilient portion.

In the reverse or reposition direction the wrench handle is operated in the reverse direction, the handle teeth engaged within the moving jaw toothed portion against the resilience of the spring acts to further open the wrench jaw gap up to the point which the jaws grip upon the fastener head is reduced enough to ensure that the jaws open sufficiently to allow the jaw operating faces to slip from one set of fastener operating faces to the next in the reverse or reposition direction, the jaws once again resiliently closing under the moving jaws resilient bias as the reverse or reposition procedure is completed. When utilized as a "ratcheting" adjustable wrench there requires to be enough jaw opening travel left when a fastener head is engaged to allow this sequence to happen, a further requirement to ensure extended jaw opening capabilities.

An even further feature of the invention may be an adjustable wrench which utilizes a true four jaw grip including first, second, third and fourth contact wall drive leverage of the correspondingly sized hexagonal fastener being operated.

The novel use of four workpiece contacting faces that each apply a drive force to the workpiece, two on each opposing jaw face, engaging the four corresponding levered faces of a hexagonal fastener, greatly increases the levering purchase upon the fastener head. Thus, various sizes of hexagonal or suitably-shaped fastener heads operated in the drive direction have more drive contact with the fixed and moving jaws. The contact area may be predominately within the half of the fastener head flats nearest the leading edge in the drive direction of the fastener driven face, which is the dominant point of leverage between a wrench and fastener head. The non-levering jaw redundant reverse profiles may be radiused inwards in order to provide as smooth as possible a reverse or reposition action, whilst minimising the movement of the moving jaw away from the fixed jaw during this action. This may contribute to the provision of a compact wrench head portion. The provision of such radiused surface portions may at least partially prevent the creation of a point of origin for stress cracking.

The provision of radiused drive portions on the workpiece contacting surfaces may provide superior gripping when the adjustable wrench is used on worn or damaged hexagonal head fasteners.

The provision of teeth on at least a portion of the workpiece contacting surfaces may provide superior gripping when the adjustable wrench is used on worn or damaged hexagonal head fasteners.

The provision of concave portions on at least one workpiece contacting surface may provide superior gripping when the adjustable wrench is used on pipework or other generally circular workpieces.

An even further feature of the invention may be the provision of an adjustable wrench capable of working on pipework and such hereafter termed a cylindrical workpiece. The fixed and moving jaw gripping faces are toothed and generally concave in shape many differing profiles exist all of which could be incorporated according to the requirements of the marketplace.

In use, the operator swivels the head portion into the open position in order to access the cylindrical workpiece, when the wrench is in the correct position the operator releases the opening pressure which causes the head portion to swivel closed under the elastic resilient force of the incumbent spring. According to the strength of the spring utilized the jaw gripping faces usefully contact and provisionally grip the cylindrical workpiece, when the handle portion is operated in the drive direction the robust gear teeth of the handle portion interact with the geared teeth of the moving jaw in order to forcefully close the moving jaw towards the fixed jaw imparting substantial grip upon the cylindrical workpiece, if the said cylindrical workpiece rotates easily less grip is consequently required, if however said workpiece was stiff or stuck, the grip applied by the jaws would, because of the geared drive become accordingly usefully proportionally far greater, the greater the force applied to the handle portion by the operator, resulting in the operating gripping teeth automatically imparting an increased level of grip upon the worked cylindrical workpiece as the wrench is operated in the drive direction, when the wrench requires to be repositioned or reversed the operator merely operates the handle portion in the reverse direction, negating the jaws grip upon the cylindrical workpiece thereby imparting an extremely useful and simple ratcheting feature with no switch required.

The pivot pin may have outer ends configured to prevent a cavity defined by the head portion from spreading, or opening, during use, and may add considerable strength to the head portion structure.

A still further feature of the invention may be the use of a separate thumb button as a method of rotating open the head portion, relative to the handle against the resilience of the spring in order that the chosen workpiece can best access the operating faces of the jaw portions. In best practice the thumb button is incorporated within the pawl portion, using the same locators and gripping methods. The further use of a legend next to the thumb button on the head portion outer face, such as a thumb and arrow in the direction of actuation being a further help in what can be a non-intuitive action. Prior to engagement upon the chosen appropriately sized fastener to be operated, the operator applies preferably thumb pressure to the head thumb operating profile as the handle is gripped within the operator's same hand. The operator by this action can open or indeed close the jaw gap as required within the specifications of the wrench jaw gap when fitting or removing the wrench from the designated fastener. By removing the thumb pressure, the moving jaw is resiliently propelled towards the fixed jaw usefully providing according to the elastic potential energy of the spring used, a useful method of providing initial jaw closing and initial locking pressure upon the fastener head to be operated.

A further feature of the invention may be the option of the use of a geared wedge closure mechanism to provide an adjustable wrench whereas the first gear tooth engaged from the jaw fully open position is greater in length than the further gear teeth utilized in order to provide greater gripping force on smaller fasteners than the larger fasteners or workpieces. The interaction of the shortest handle levered end gear tooth upon the moving jaw wedge shaped toothed rack usefully corresponding to the wrench head operating profile generally fully open, larger fastener operating position, handle leverage therefore being at its greatest when the largest size of fastener is engaged and worked. The use of progressively longer handle levered end teeth biased in the drive direction, usefully provides a far greater jaw closure movement as the handle is turned in the drive direction and the head portion swivels around the pivot pin as the head portion engages smaller sized fasteners. This novel design provides the required superior jaw locking closure force required when operating the larger sizes of fastener heads yet can sustain according to the chosen gearing ratio between the handle gears and the moving jaw geared wedge sufficient moving jaw locking closure force when operating the smaller sizes of fastener heads. This design enables superior closure movement over previous geared closure designs, a typical prior art 8 inch (203 mm) adjustable utilizing geared locking closure could be capable of a closure range of 7 mm whereas the present invention is usefully easily capable of a closure range of 15 mm which is commercially a distinct advantage as the standard three wrench sizes 6 inch (152 mm), 8 inch (203 mm) and 10 inch (255 mm) jaw sizes can now be covered by three different-sized adjustable wrenches according to the invention, whereas prior art geared wrenches require at least six to eight different-sized wrenches to cover a similar jaw size range.

While one or more preferred embodiments of the preferred invention have been described above, it should have been understood that any and all equivalent realisations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope of appended claims.

BRIEF DESCRIPTION OF THE DRAWINGS

A full and enabling disclosure of the present invention including the best mode thereof, directed to one of ordinary skill in the art, is set forth in the specification, which makes reference to the appended drawings, in which.

REFERENCE TO THE DRAWINGS

Figure 1:
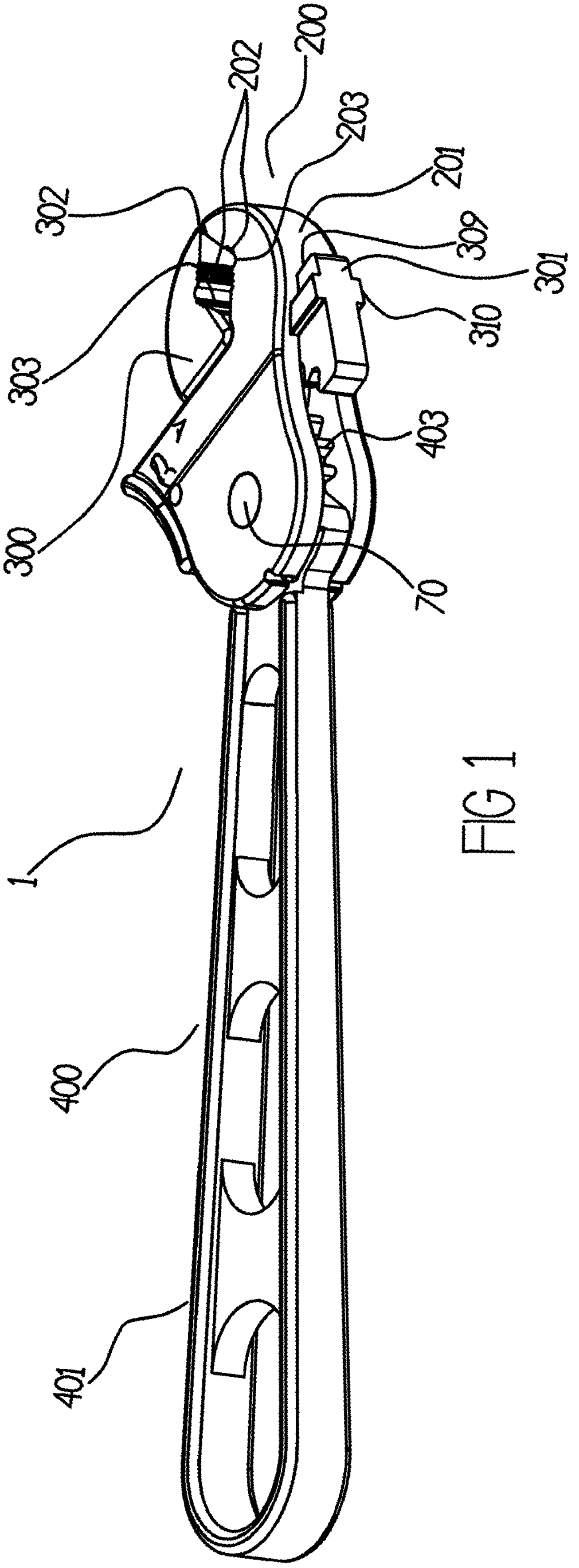
FIG. 1 is a perspective view of an adjustable wrench with the head portion in a closed position.

Following is a listing of the various components used in the best mode preferred embodiment and alternative embodiments. For the ready reference of the reader the reference numerals have been arranged in ascending numerical order.

1/Adjustable Wrench
200/Head Portion
201/Fixed Jaw Position
202/Fixed Jaw 1st Operating Face
203/Fixed Jaw 2nd Operating Face
204/Fixed Jaw Convex Operating Surface
205/Fixed Jaw Toothed Operating Surface
206/Fixed Jaw Flat Operating Surface
207/Fixed Jaw Concave Operating Surface
208/Fixed Jaw Fastener Operating Surface
209/Fixed Jaw Fastener Ratcheting Profile
210/Fixed Jaw Radiused Portion
211/Head Portion Sliding Rail Face
212/Head Portion Alignment Key Recess
213/Head Portion Cavity
214/Head Portion Spring Location -continued 215/Head Portion Pivot Pin Hole
216/Head Portion Pawl Pin Hole
217/Head Portion Direction Legend
300/Moving Jaw
301/Moving Jaw Sliding Rail
302/Moving Jaw 3rd Operating Face
303/Moving Jaw 4th Operating Face
304/Moving Jaw Ratcheting Profile
305/Moving Jaw Toothed Operating Face
306/Moving Jaw Flat Operating Face
307/Moving Jaw Concave Operating Face
308/Moving Jaw Radiused Portion
309/Moving Jaw Sliding Rail Face
310/Moving Jaw Alignment Key
311/Moving Jaw Geared Rack
312/Moving Jaw Wedged Geared Rack
313/Rack Gear
314/Moving Jaw Operating Stop Face
315/Moving Jaw Gear Teeth Back Face
400/Handle
401/Handle Levering Portion
402/Handle Levered Portion
403/Handle Gear Teeth
404/Handle Pivot Pin Hole
405/Handle Pivot Pin Hole Elongate Portion
406/Handle Spring Location
407/Handle Locking Teeth
408/Handle Opening Stop
409/Handle Closing Stop
410/Handle Upright Saw Toothed Face
411/Handle Inclined Saw Toothed Face
412/Handle Gear Teeth Back Face
50/Spiral Spring
51/Spring Internal End
52/Spring External End
60/Pawl
61/Pawl Teeth
62/Pawl Stop Face
63/Pawl Pin Hole
64/
65/Pawl Thumb Button
66/Pawl locking Ratchet Teeth
67/Pawl Upright Toothed Profile
68/Pawl Inclined Toothed Profile
70/Pivot Pin
71/Pawl Pin
72/Pivot Pin Screws
80/Fastener
81/Hexagonal Fastener Head
82/Hexagonal Fastener Head Flats
83/Fastener Levering Portions
84/Hexagonal Fastener Head Anti clockwise Levering Portions
85/Hexagonal Fastener Head Points
86/Cylindrical Workpiece
D/Drive Direction
R/Reverse Direction
G/Jaw Gap
CF/Clamping Force
PP/Pivotal Point

DETAILED DESCRIPTION

FIGS. 1 to 15 illustrate versions of an adjustable wrench 1 comprising a head portion 200 having a fixed jaw 201 provided with two workpiece contacting surfaces 202, 203 and a moving jaw 300 provided with a further two workpiece contacting surfaces 302, 303.

The moving jaw 300 is provided with a rack gear 313 that is capable of sliding back and forth in a head portion cavity 213. The moving jaw 300 is guided along a pathway defined by sliding rail faces 212, 309 provided within the head portion 200. The moving jaw 300 has an alignment key 310 configured to engage the sliding rail faces 212, 309.

Figure 3:
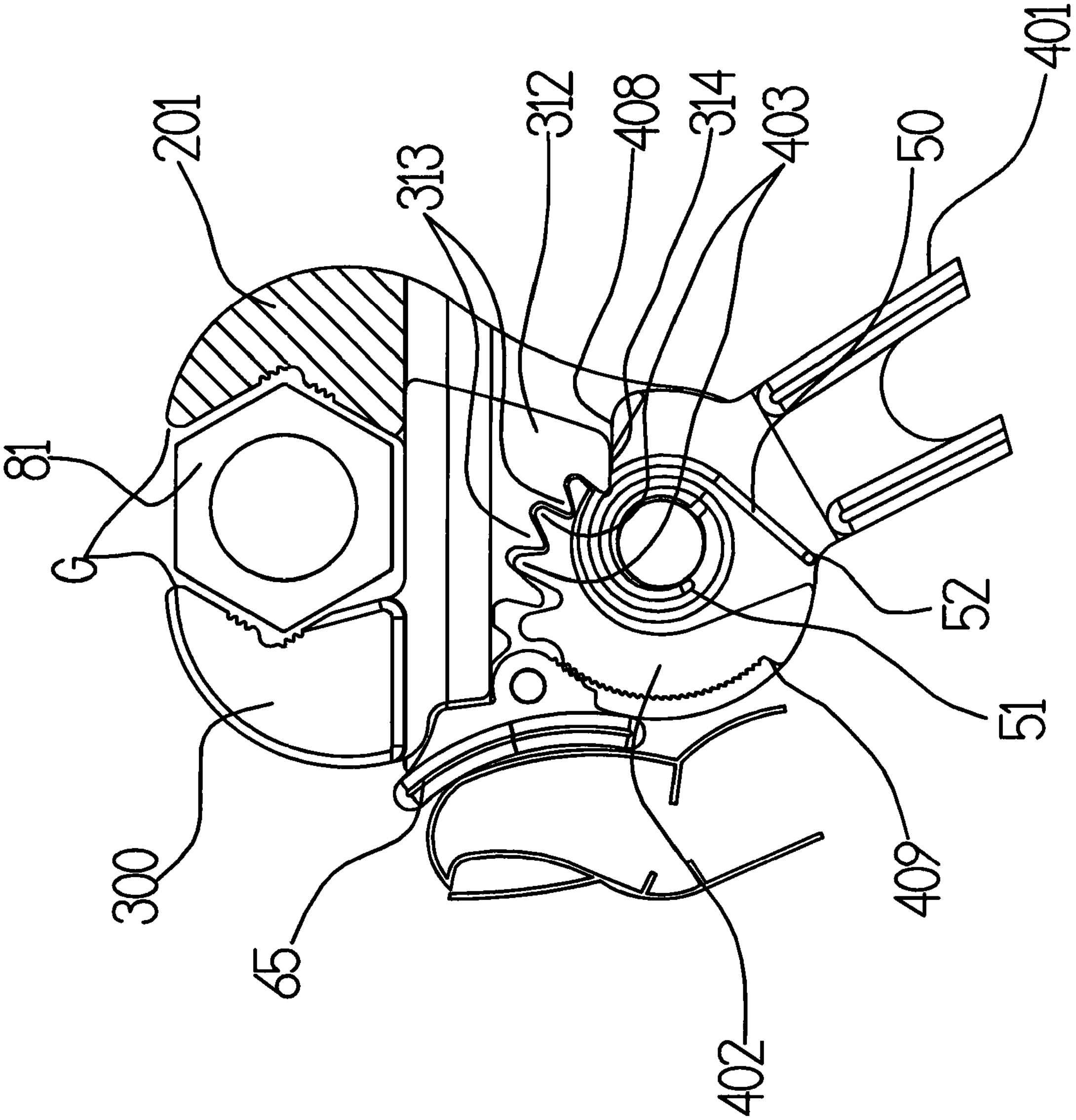
FIG. 3 is a top close up view of the adjustable wrench head portion, the head portion being biased into the open position by the action of the operator, with a hexagonal fastener head within the jaw gap.
Figure 4:
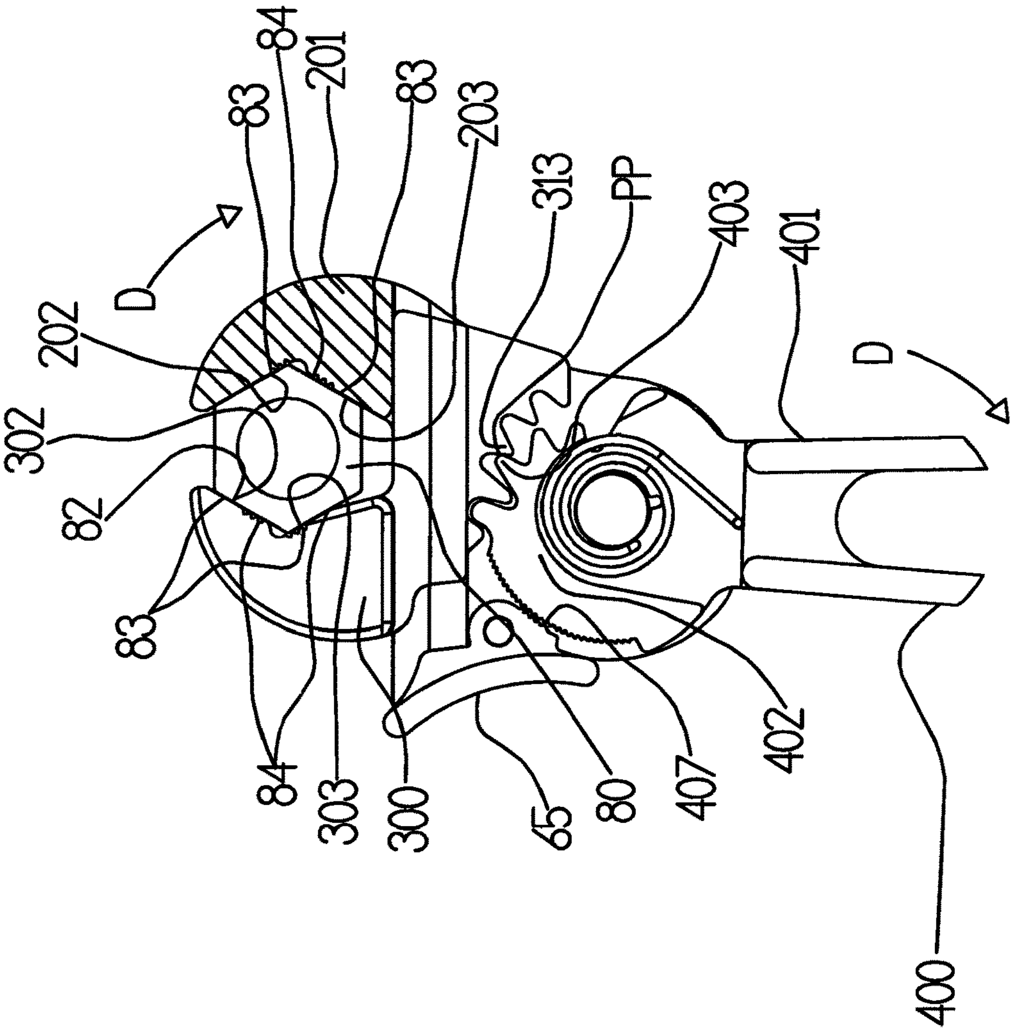
FIG. 4 is a top close up view of the adjustable wrench head portion, the head portion griping and operating a large fastener head in the drive direction, illustrating the jaws four face drive of the hexagonal fastener head. The fixed jaw, head portion illustrated in section in order to show the handle gear teeth levering against the moving jaw geared rack.

As shown in FIGS. 3 and 4, the adjustable wrench 1 has a handle, or lever, 400 provided with an array of gear teeth 403. The gear teeth 403 are disposed at the levered, or head, end 402 of the handle 400. The gear teeth 403 engage with the rack gear 313 of the moving jaw 300.

Figure 2:
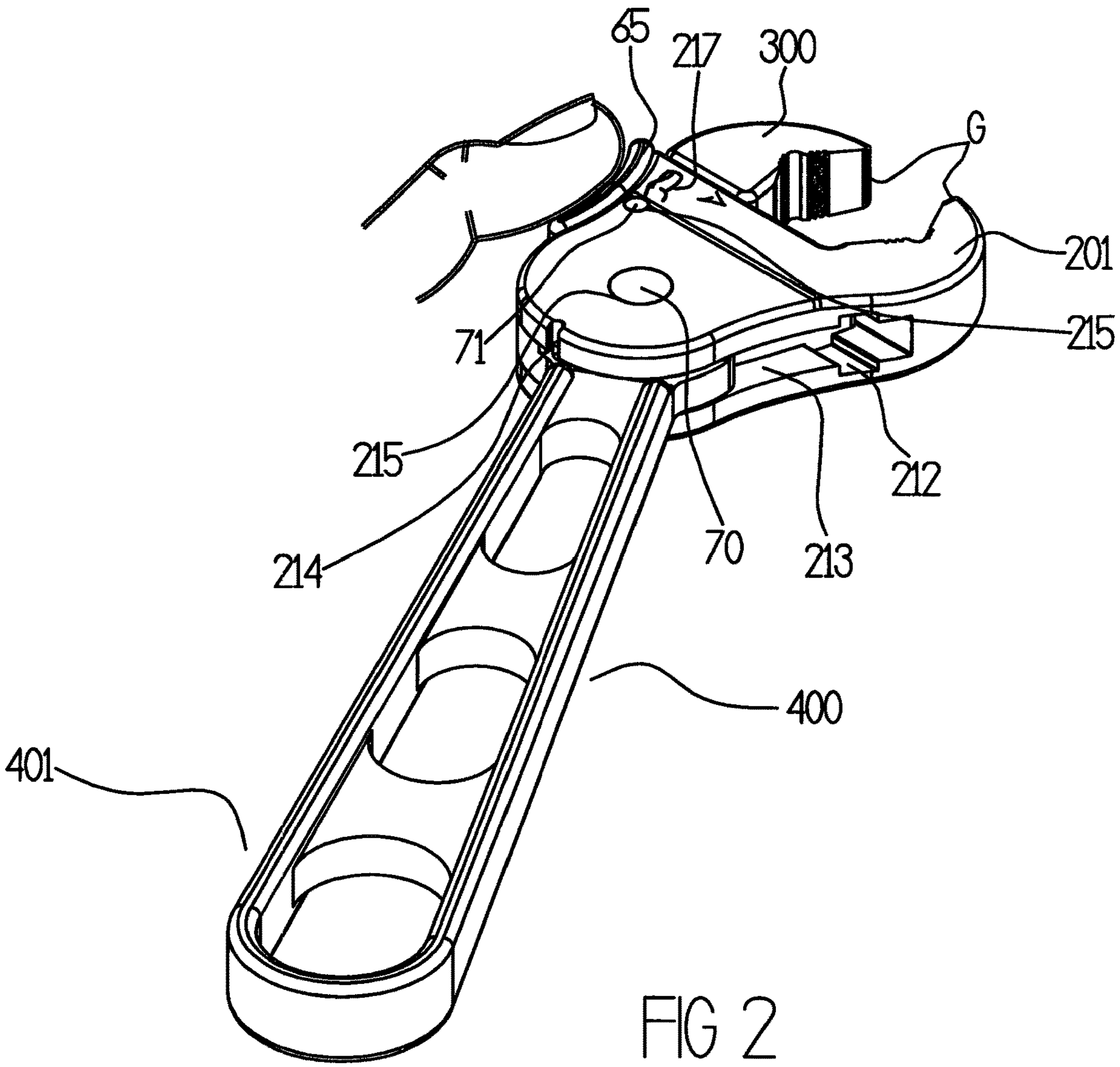
FIG. 2 is a perspective view of the adjustable wrench with the head portion in an open condition.

To use the adjustable wrench 1, the user uses a button 65 to release a locking mechanism (described below) and rotates the handle 400 against the resilience of a spring 50 to move the moving jaw 300 to an open position (shown in FIG. 2). The rotation of the handle 400 may be transmitted to the moving jaw 300 by the engagement of the gear teeth 403 on the head end 402 with the teeth of the rack gear 313. The spring 50 is attached between the head end 402 of the handle 400 and the fixed head portion 200. The spring 50 may be a torsion spring. The button 65 may be positioned so that it can be operated by the user's thumb (the most intuitive digit). A direction legend 217 as shown in FIG. 1 may be provided on the head portion 200 to assist the user. Providing the fastener 80 is of a suitable size, the fastener head 81 may be fitted within the gap G created between fixed jaw 201 and moving jaw 300. When the user's thumb pressure is released from the button 65, the spring 50 automatically propels the moving jaw 300 towards the fixed jaw 200, provisionally clamping the fastener 80 under the resilient elastic force of the spring 50. The head end 402 can now be rotated in the drive direction D around a pivot pin 70. The pivot pin 70 is secured within the fixed head portion 200 and extends through an elongate pin hole 404 provided in the handle 400. The engagement between the gear teeth 403 on the head end 402 and teeth of the rack gear 313 turn the head portion 200 and the engaged fastener 80 while driving the moving jaw 300 towards the fixed jaw 200 so that the respective workpiece contacting surfaces 202, 203, 302, 303 clamp progressively harder upon the fastener levering portions 83.

Figures 8, 9, 10:
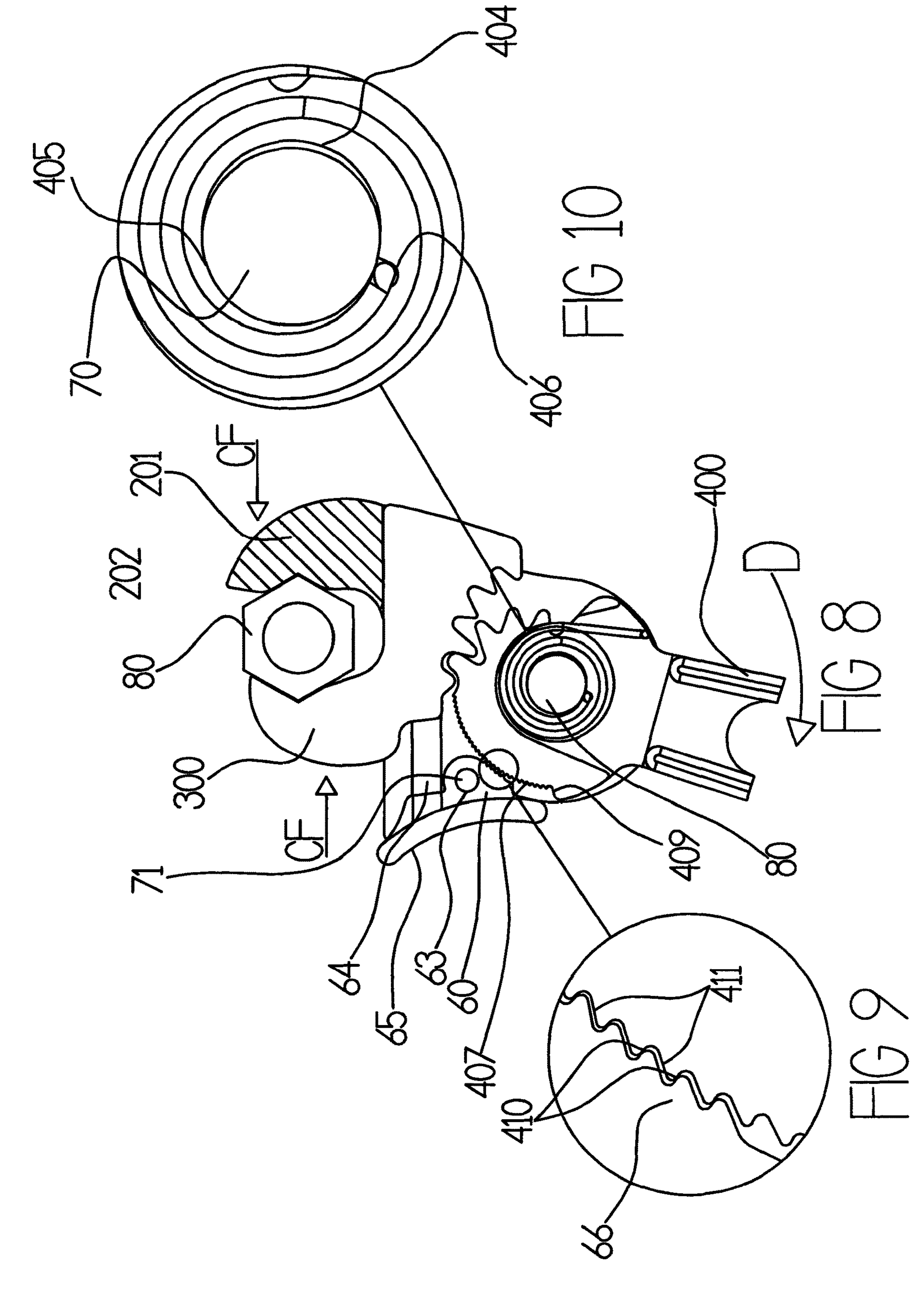
FIG. 8 is a top close-up view of the adjustable wrench head, utilizing a head portion which is automatically adjustable within its size range, robustly operating in the drive direction a medium sized hexagonal fastener head. The fixed jaw head portion illustrated in section in order to show the handle gear teeth robustly levering closed the moving jaw via the its associated geared rack. The handle pivoting at the point that the relevant handle gear tooth engages the corresponding moving jaw gear tooth urging the handle locking teeth into the pawl locking teeth within the confines of the pivot pin hole elongate portion usefully creating a jaw locking mechanism.
FIG. 9 is a close up view of the pawl and corresponding handle locking teeth, utilizing in the illustrated example, saw toothed locking profiles.
FIG. 10 is a close up view of the handle pivot pin hole whereby the pivot pin is urged into the handle pivot pin hole elongate portion.
Figure 11:
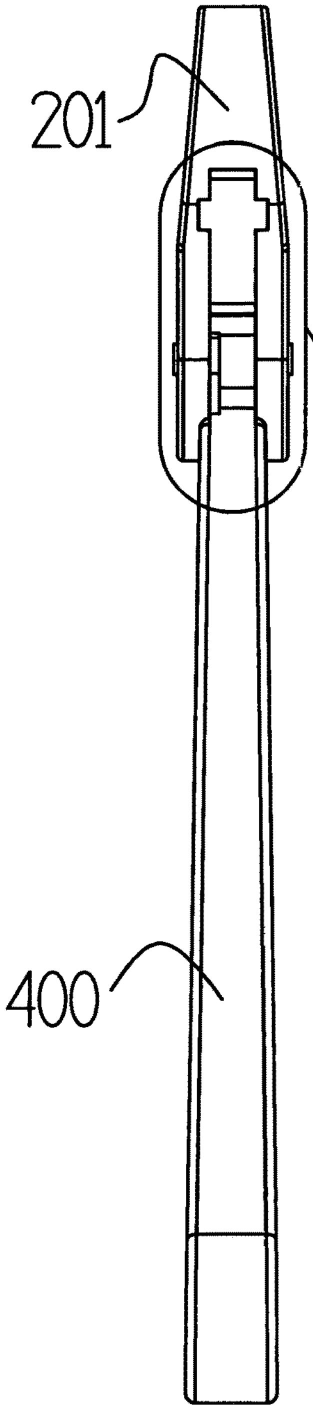
FIG. 11 is a side view of the adjustable wrench.
Figure 12:
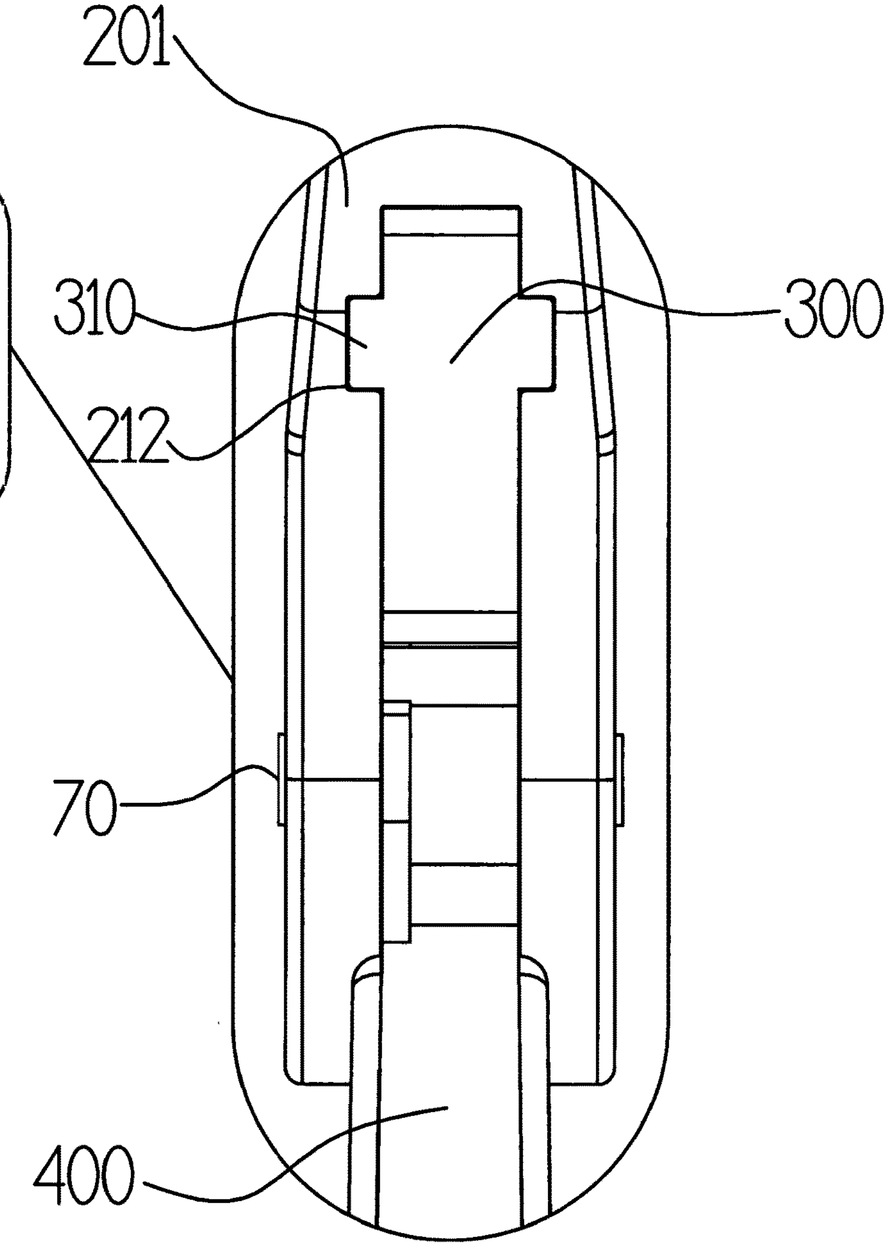
FIG. 12 is a top close up side view of the adjustable wrench head portion.

As shown in FIGS. 8 and 9, the above-mentioned locking mechanism is a ratchet-like mechanism configured to prevent the jaws 201, 300 from spreading (moving apart) when the adjustable wrench 1 is applying large forces to a fastener 80 in the drive direction D. The locking mechanism may comprise respective sets of ratchet teeth 61, 407 (FIG. 15) provided on the head portion 200 and the handle 400. The ratchet teeth 407 may have saw-like profiles 410 and be provided on the periphery of the head end 402 of the handle 400. The correspondingly profiled teeth 61 may be provided on a pawl 60 fixed to the head portion 200. The button 65 may be provided on the pawl 60.

As best seen in FIG. 10, the elongate pin hole 404 is appropriately elongated 405 such that when the workpiece contacting faces 202, 203, 302, 303 have engaged the fastener 80 and the handle 400 is forced in the drive direction D, the engagement of the gear teeth 403 with the rack gear 313 causes the handle portion 400 to pivot around the point of engagement of the engaged gear teeth 403 and the rack gear 313 into and within the confines of the elongate pin hole 404 until the ratchet teeth 407 on the head end 402 engage the pawl teeth 61. As the handle 400 is turned further, it can increase the gripping force CF of the fastener contact faces 202, 203, 302, 203 upon the fastener head levering portions 83, with the ratchet teeth 407 moving up the corresponding inclined ratchet teeth 61 in order, if required, to engage the next set of ratchet locking upright faces 67, 411. In best practice, the faces 67, 111 are disposed on a generally radial line from the centre of the pivot pin 70. As any further drive force D applied to the fastener 80 reaches a point greater than the gripping force CF generated by the ratio of the levering 401 to levered 402 forces generated within the handle portion 400 upon the moving jaw 300 through the gear teeth 403 and rack gear 313 to the workpiece contacting surfaces 202, 203, 302, 303, the locking engagement between the ratchet locking teeth and the pawl teeth prevents the "spreading of the jaws 201, 300 due to the gearing ratio of the handle levering portion 401 to the head end 402 being insufficient at any point. In the reverse or reposition R action the handle 400, handle gear tooth back face 412 is now pivoted upon the back face 315 of the opposing geared ramp tooth of the rack gear 313 levering out of engagement as required the ratchet locking teeth 407 from the pawl teeth 61, releasing any ratchet locking function. The orientation of the inner profile of the p spring 50 against the pivot pin 70 circumference aids this action and ensures the pivot pin 70 is disengaged from the elongate pin hole and any engagement of the ratchet locking teeth 407 and pawl teeth 61 is removed when the adjustable wrench 1 is reversed R or at rest.

Figure 6:
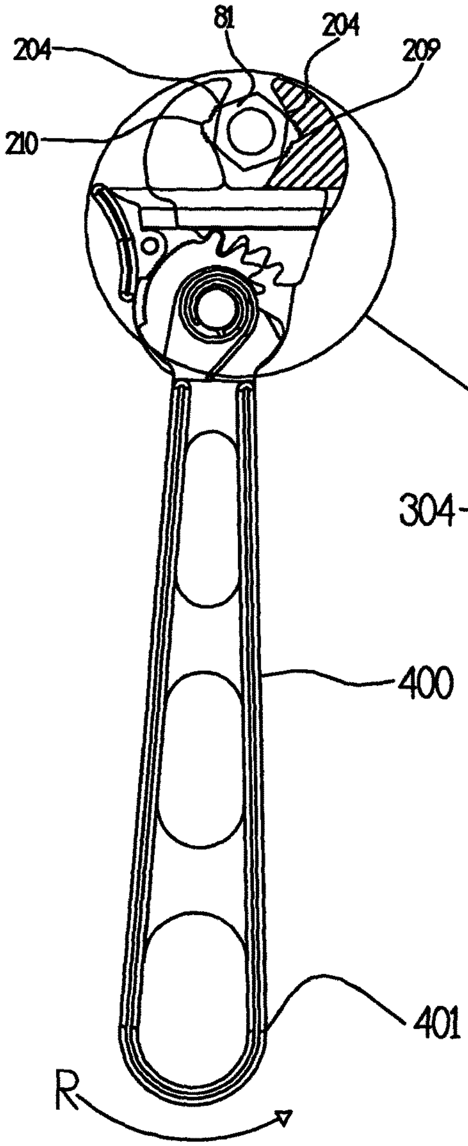
FIG. 6 is a top view of the adjustable wrench shown operating a hexagonal fastener in the reverse direction, the fixed jaw being illustrated in section.
Figure 7:
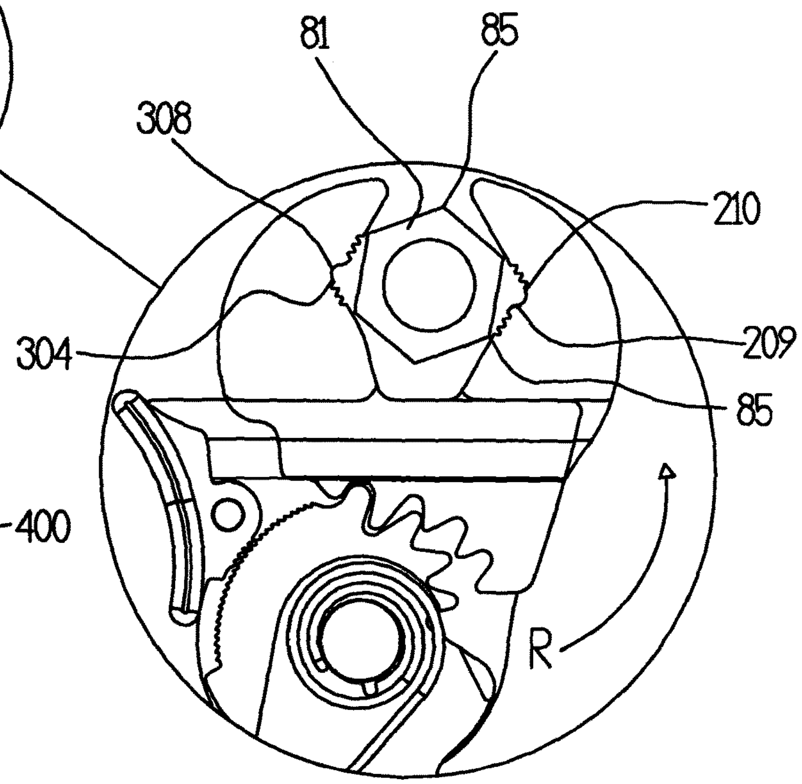
FIG. 7 is a close-up top view of the adjustable wrench head portion, the wrench shown being maneuvered in the reverse direction upon a hexagonal fastener. The jaws opening against the resilient spiral spring by the leverage of the jaw surfaces against the fastener points, the back face of the handle gear teeth further usefully levering against the corresponding moving jaw gear teeth ensuring the required ease of reverse movement of the wrench head from one fastener flat to the next. The useful radiused ratcheting profiles used, further shown. The fixed jaw

As illustrated in FIGS. 6 and 7 when the reverse or reposition direction R is required the handle 400 is operated in the reverse direction R, the back faces 412 of the gear teeth 403 on the head end now engage with the back faces 315 of the teeth of the rack gear 313 against the resilience of the spring 50 acting to open the wrench jaw gap G up to the point at which the grip of the jaws grip CF upon the fastener head 81 is reduced enough that the jaws 201, 300 open sufficiently to allow the workpiece contacting faces 202, 203, 302, 303 to slip as required from one set of fastener operating faces 82 to the next in the reverse or reposition direction R, the jaws 201, 300 closing under the resilient bias provided by the spring 50 acting on the moving jaw 300 as the reverse or reposition procedure R is completed. When utilized as a ratcheting adjustable wrench 1 there requires to be enough jaw 201, 300 opening G travel left when a fastener head 81 is engaged to allow this sequence to happen, a further requirement to ensure extended jaw opening G capabilities.

As illustrated in FIG. 4 the adjustable wrench 1 is further characterized by a superior gripping force CF of the fastener 80 or workpiece 86, whilst employing extended jaw opening G capabilities, by the use of a geared wedge 312, 403 closure mechanism. The head end 402 of the handle 400 having gear like teeth 403 which innovatively increase in pivotal length or height in the operated drive direction D in order to act upon the teeth of the rack gear 313. The interaction of the shortest gear tooth 403 upon the gear rack teeth usefully corresponding to the wrench head portion 200 operating profile generally fully open, larger fastener 80 operating position, the handle leverage 401, 402 therefore being at its greatest when the largest size of fastener 80 is engaged and worked. The use of progressively longer handle levered end teeth 403 biased in the drive direction D, usefully provides a far greater jaw 201, 300 closure movement as the handle 400 is turned in the drive direction D and the head 200 swivels around the pivot pin 70 as the head portion 200 engages smaller sized fasteners 80. This novel design provides the required superior jaw 201, 300 locking closure force CF required when operating the larger sizes of fastener heads 81 yet can sustain according to the chosen gearing ratio between the handle gears 403 and the moving jaw geared wedge 312 proportional moving jaw locking closure force CF when operating the smaller sizes of fastener heads 81.

Figure 5:
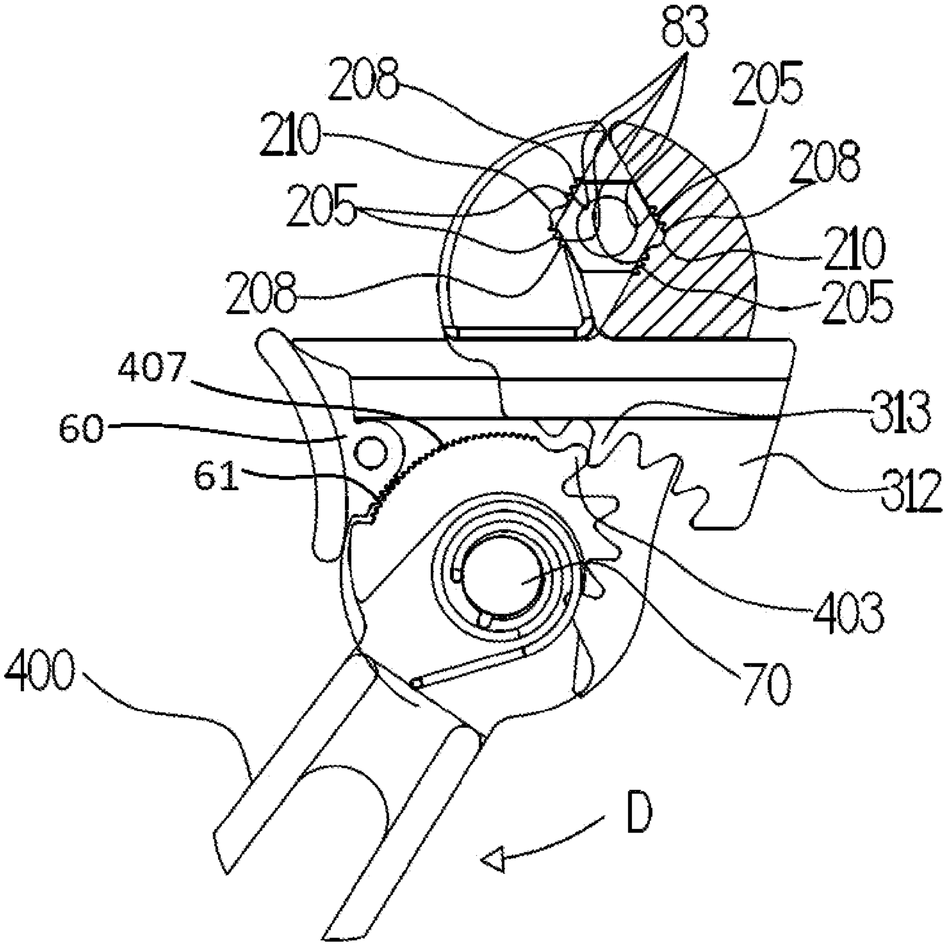
FIG. 5 is a top close up view of the adjustable wrench head portion, the head portion griping and operating a small fastener head in the drive direction, illustrating the jaws four face drive of the hexagonal fastener head. The first jaw, head portion illustrated in section in order to show the handle gear teeth levering against the second jaw geared rack.

An even further characterising feature of the present invention 1 is the provision of an adjustable wrench 1 which utilizes a true four jaw 202, 203, 302, 303 drive when utilized in the drive D direction, including first 202, second 203, third 302 and fourth 303 operating faces, drive D leverage 83 of the correspondingly sized hexagonal fastener head 81 being operated, the use of four workpiece contacting surfaces 202, 203, 302, 303 two within each opposing jaw 201, 300 closing face, engaging the four corresponding levered faces 83 of the hexagonal fastener head 81 to apply a drive force to the fastener, greatly increasing the levering purchase upon the fastener head 81 operated, the various sizes of hexagonal or suitable shaped fastener heads 81 operated in the drive direction D thereby usefully have more drive contact 83 between the workpiece contacting faces 202, 203, 302, 303 and the fastener head operated flats 82, the contact area being predominately within the half of the fastener head flats 83 nearest the leading edge 85 in the drive direction D of the fastener driven face 82 which is the dominant point of leverage 83 between a wrench 1 and fastener head 81. The non-levering jaw redundant reverse profiles 304 are usefully radiused 308 inwards in order to provide as smooth as possible a reverse or reposition R action whilst minimising the movement of the moving jaw 300 outwards from the fixed jaw 201 during this action, usefully contributing to the compactness of the wrench head 200. A further useful feature of those radiused workpiece contacting faces 210, 308 is in order to prevent as far as possible a point of stress crack creation. FIG. 5 illustrates how toothed workpiece contacting surfaces 205, 305, whether partially or fully toothed can provide superior gripping when acting on worn or damaged hexagonal head fasteners 81.

Figure 13:
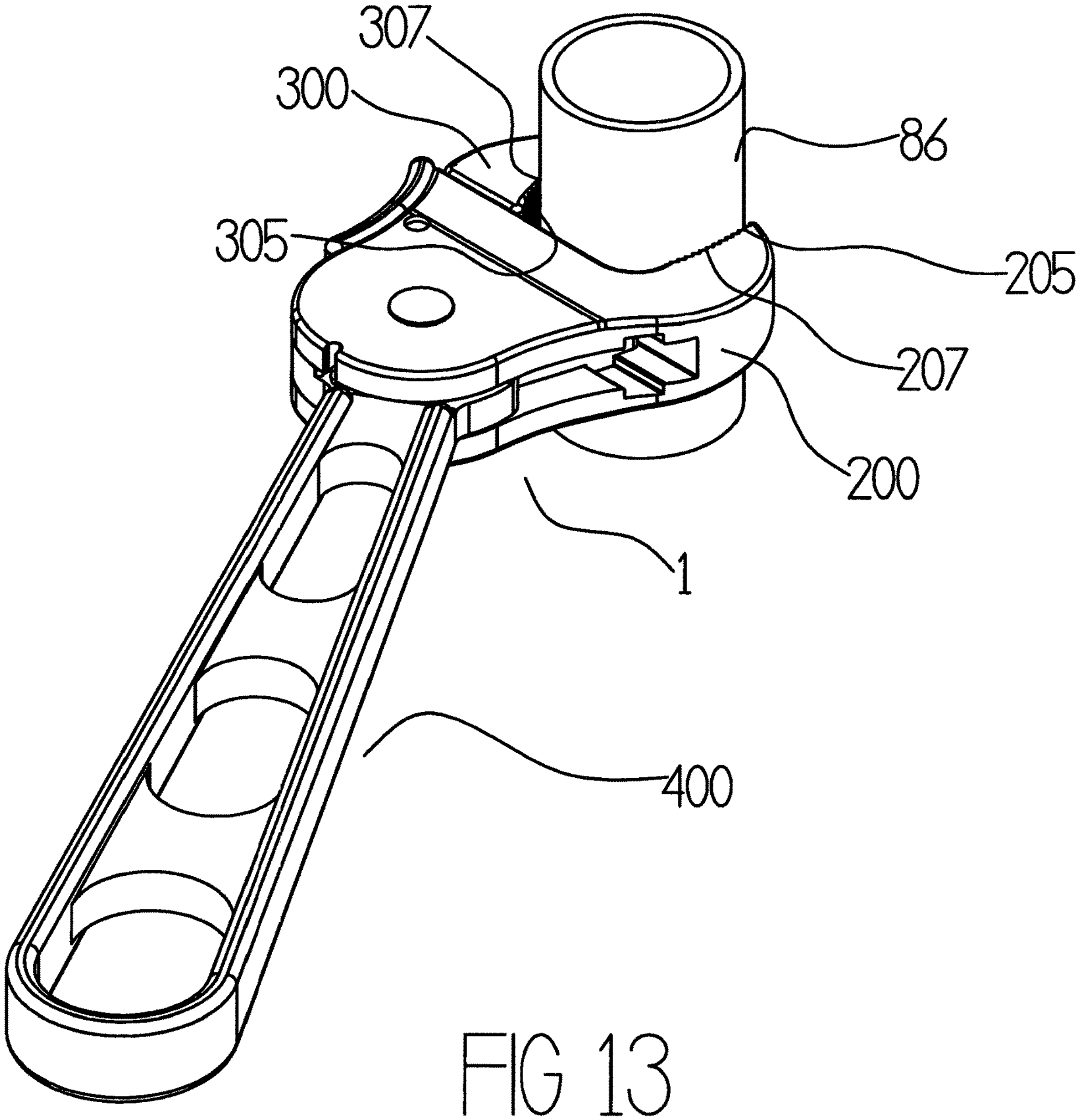
FIG. 13 is a perspective view of the adjustable wrench with concave toothed jaws gripping a cylindrical workpiece.
Figure 14:
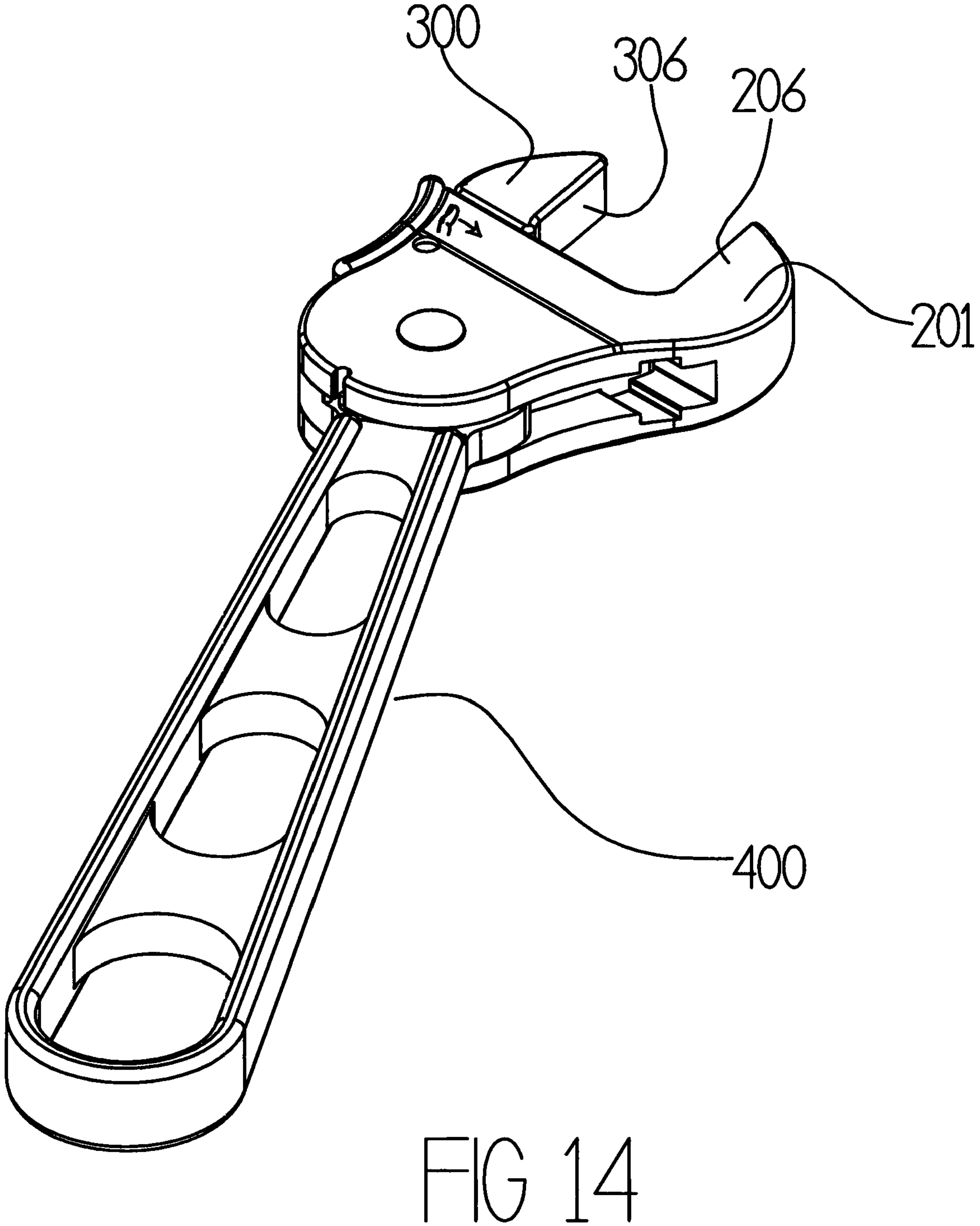
FIG. 14 is a perspective view of the adjustable wrench with straight jaws.
Figure 15:
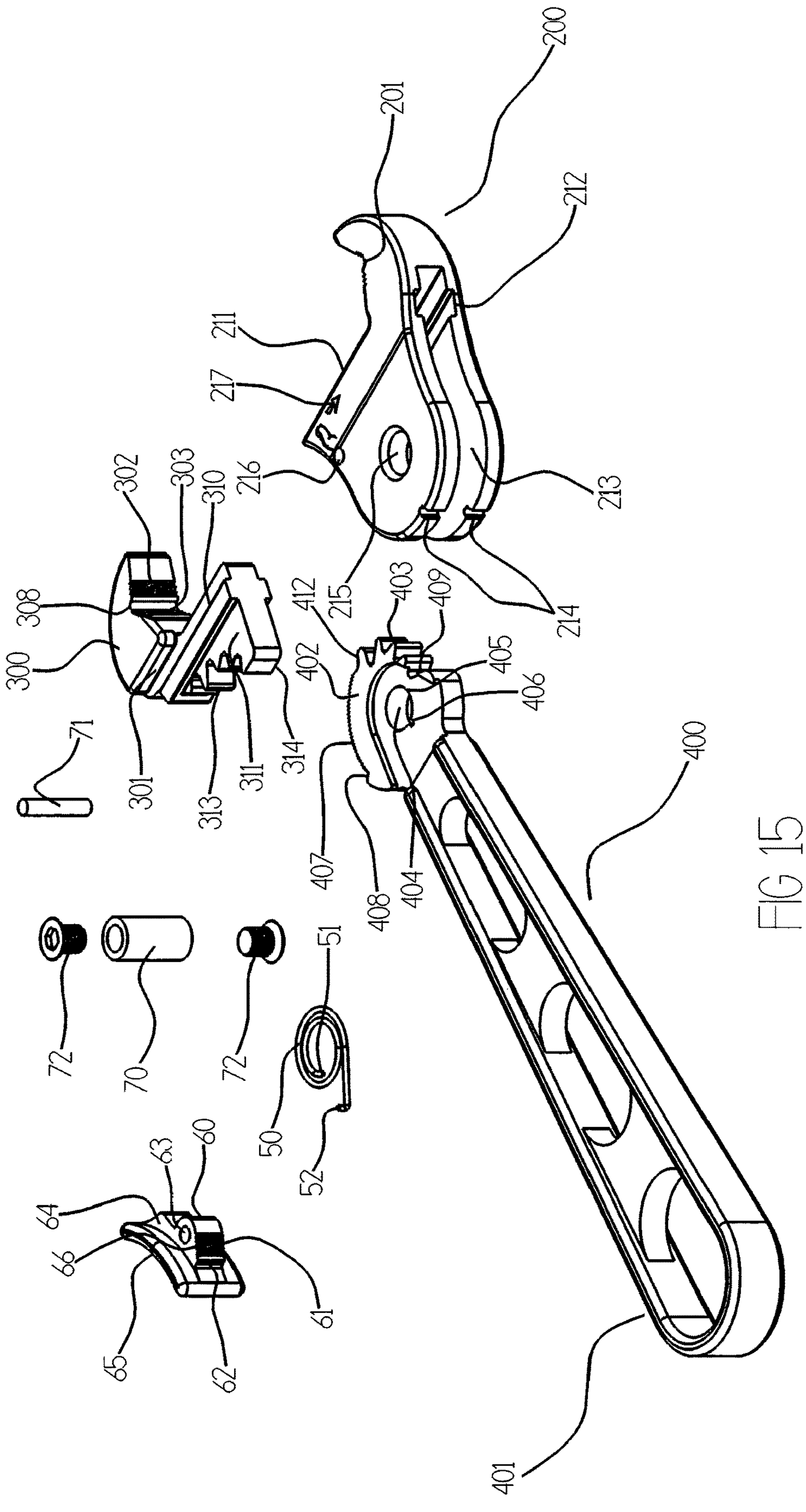
FIG. 15 is a perspective view of the adjustable wrench, the wrench dismantled into its constituent parts for display purposes.

FIG. 13 shows a modification of the adjustable wrench 1 in which one or both of the fixed and moving jaws is provided with concave workpiece contacting faces 205, 305. These may provide superior gripping when used on pipework or circular workpieces 86. It will be understood that many differing profiles may be provided to facilitate use with differently shaped workpieces.

The invention claimed is:

1. An adjustable wrench comprising;

a head portion comprising a fixed jaw and a moving jaw; and a handle portion attached to the head portion by a pivot pin extending through an elongate pin hole defined by the handle portion, wherein the handle portion comprises a levering end and a head end that is provided with gear teeth that engage a rack gear provided on the moving jaw for moving the moving jaw relative to the fixed jaw, and wherein the handle portion is provided with ratcheting locking teeth on said head end that are engageable with pawl teeth provided on a pawl that is fixed to the head portion to form a locking mechanism for preventing spreading of the fixed and moving jaws.

2. An adjustable wrench as claimed in claim 1, wherein the arrangement is such that when the handle portion is turned in a drive direction engagement of the gear teeth on the head end with the rack gear causes said moving jaw to move towards said fixed jaw and the handle portion to pivot around a point of engagement of said gear teeth and said rack gear into and within the confines of the elongate pin hole to propel the ratcheting locking teeth into engagement with the pawl teeth to lock the fixed and moving jaws.

3. An adjustable wrench as claimed in claim 2, wherein the ratcheting locking teeth are provided on a peripheral portion of the head end.

4. An adjustable wrench as claimed in claim 3, further comprising a spring located between the handle portion and the head portion, wherein a first end of said spring is fixed to the handle portion and a second end is fixed to the head portion to bias the moving jaw towards the fixed jaw by resiliently propelling the handle portion around said pivot pin, and wherein the gear teeth on said head end engaging said rack gear transmit a biasing force provided by said spring to said moving jaw.

5. An adjustable wrench as claimed in claim 4, wherein the pivot pin has a circumferentially extending surface and said spring has an inner profile configured such that said circumferentially extending surface is disengaged from the elongate pin hole whereby the gear teeth on the head portion and the pawl teeth are released from locking engagement when the wrench is at rest.

6. An adjustable wrench as claimed in claim 4, wherein the arrangement is such that when the fixed and moving jaws engage a workpiece and the handle portion is driven by a drive force acting in a direction opposite the drive direction, the engagement of the gear teeth on the head end and the rack gear causes the moving jaw to move against the resilience of the spring away from the fixed jaw to reduce the grip upon the workpiece sufficiently to allow respective workpiece contacting faces of said fixed and moving jaws to slip over the workpiece and when said drive force is released said spring causes said moving jaw to move towards said fixed jaw to close said fixed and moving jaws onto said workpiece.

7. An adjustable wrench as claimed in any one of claims 1 to 4, wherein said moving jaw and said fixed jaw each comprise two workpiece contacting surfaces and the two workpiece contacting surfaces of the moving jaw are disposed opposite the two workpiece contacting surfaces of the fixed jaw for engaging the four faces of a hexagonal fastener.

8. An adjustable wrench as claimed in claim 7, wherein at least one of said fixed and movable jaws comprises a radiused workpiece contacting surface.

9. An adjustable wrench as claimed in claim 6, wherein at least one of said fixed and movable jaws comprises an at least partially toothed workpiece contacting surface.

10. An adjustable wrench as claimed in claim 6, wherein at least one of said fixed and movable jaws has a toothed concave workpiece contacting surface for gripping circular workpieces.

11. An adjustable wrench as claimed in any of claims 1 to 4, wherein the head portion comprises a cavity that receives at least a part of said head end and said pivot pin has first and second outer ends secured to said head portion and arranged to resist opening of said cavity.

12. An adjustable wrench as claimed in any one of claims 1 to 4, wherein a thumb button is provided on said head portion for rotating open the head portion relative to the handle against the resilience of the spring to provide a gap between said fixed and movable jaws to receive a workpiece.

13. An adjustable wrench as claimed in claim 12, wherein a direction indicator is provided on an outer face of said head portion adjacent said thumb button.

14. An adjustable wrench as claimed in any of claims 1 to 4, wherein a leading gear tooth of said gear teeth on said head end that is the first of tooth of said gear teeth to engage said rack gear when said movable jaw is moved from a fully open position towards said fixed jaw has a height that is greater than a height of following said gear teeth of said head end.

15. An adjustable wrench comprising;

a head portion comprising a fixed jaw and a moving jaw; and a handle portion attached to the head portion by a pivot pin extending through an elongate pin hole defined by the handle portion, wherein the handle portion comprises a levering end and a head end that is provided with gear teeth that engage a rack gear provided on the moving jaw for moving the moving jaw relative to the fixed jaw, wherein the head end is provided with ratcheting locking teeth engageable with pawl teeth provided on a pawl that is fixed to the head portion to form a locking mechanism for preventing spreading of the fixed and moving jaws, wherein the handle portion has a length defining a first direction that is a lengthways direction of the handle portion said pin hole and pivot pin extend in a second direction that is transverse to said first direction and said pin hole is elongated in a third direction that is transverse to said first and second directions so that said pivot pin can move across said handle portion in said third direction along said elongate pin hole, whereby when the handle portion is turned in a drive direction, engagement of the gear teeth on the head end with the rack gear causes said moving jaw to move towards said fixed jaw and the handle portion to pivot around a point of engagement of said gear teeth and said rack gear into and within the confines of the elongate pin hole to propel the ratcheting locking teeth into engagement with the pawl teeth to lock the fixed and moving jaws.

16. An adjustable wrench as claimed in claim 15, wherein said moving jaw is biased towards said fixed jaw by a spring connected with said head end and said head portion.

17. An adjustable wrench as claimed in claim 16, wherein said spring is a torsion spring and said pivot pin passes through said torsion spring.

18. An adjustable wrench as claimed in claim 15, 16 or 17, wherein said gear teeth on said head end comprise a leading end gear tooth that is the leading tooth engaging said rack gear when said movable jaw is moved from a fully open position towards said fixed jaw, said gear teeth each have a height and the height of said leading tooth is greater than the height of the other said gear teeth.

19. An adjustable wrench as claimed in claim 18, wherein the respective heights of successive other said gear teeth are progressively less than the height of said leading end gear tooth.

20. An adjustable wrench as claimed in claim 15, 16 or 17, wherein said head portion defines a guide track for a guide member provided on said moving jaw and said rack gear is inclined with respect to said guide track.

* * * * *